United States Patent
Hanyu

(10) Patent No.: US 8,194,350 B2
(45) Date of Patent: Jun. 5, 2012

(54) HEAD, HEAD SUSPENSION ASSEMBLY, AND DISK DRIVE PROVIDED WITH THE SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 12/760,335

(22) Filed: Apr. 14, 2010

(65) Prior Publication Data

US 2010/0321834 A1 Dec. 23, 2010

(30) Foreign Application Priority Data

Jun. 19, 2009 (JP) ................................. 2009-146796

(51) Int. Cl.
*G11B 5/60* (2006.01)
(52) U.S. Cl. .................................................... 360/236.3
(58) Field of Classification Search .................. None
See application file for complete search history.

(56) References Cited

U.S. PATENT DOCUMENTS

| | | | | |
|---|---|---|---|---|
| 6,809,904 | B2 * | 10/2004 | Boutaghou et al. | 360/235.8 |
| 7,154,709 | B2 * | 12/2006 | Rao et al. | 360/235.8 |
| 7,209,323 | B2 * | 4/2007 | Boutaghou et al. | 360/235.5 |
| 7,245,455 | B2 * | 7/2007 | Rajakumar | 360/235.8 |
| 7,262,937 | B2 * | 8/2007 | Pendray et al. | 360/235.1 |
| 7,359,155 | B2 * | 4/2008 | Hanyu | 360/236.3 |
| 7,679,863 | B2 * | 3/2010 | Hashimoto et al. | 360/235.7 |
| 2002/0008939 | A1 * | 1/2002 | Boutaghou et al. | 360/235.8 |
| 2006/0082928 | A1 | 4/2006 | Takahashi et al. | |
| 2007/0121251 | A1 * | 5/2007 | Yoshida | 360/236.3 |
| 2007/0211385 | A1 * | 9/2007 | Kondo et al. | 360/236.1 |
| 2008/0158716 | A1 | 7/2008 | Kubotera et al. | |
| 2011/0090597 | A1 | 4/2011 | Hanyu | |

FOREIGN PATENT DOCUMENTS

| | | |
|---|---|---|
| JP | 2000-021110 | 1/2000 |
| JP | 2006-120228 | 5/2006 |
| JP | 2007-149297 | 6/2007 |
| JP | 2008-016068 | 1/2008 |
| JP | 2008-181627 | 8/2008 |
| JP | 2009-76173 | 4/2009 |
| JP | 2009-134830 | 6/2009 |

OTHER PUBLICATIONS

Japanese Office Action dated Jan. 10, 2012 for Japanese Application No. 2010-253700.

* cited by examiner

*Primary Examiner* — Mark Blouin
(74) *Attorney, Agent, or Firm* — Knobbe, Martens, Olson & Bear, LLP

(57) ABSTRACT

According to an embodiment, a head includes a slider and a head portion on the slider. A facing surface of the slider includes a negative-pressure cavity defined by a recess in the facing surface, a leading step portion on an upstream side of the negative-pressure cavity, a pair of side portions extending in a first direction from the leading step portion, a trailing step portion on an outflow side of the negative-pressure cavity, a pair of skirt portions extending in the first direction from the side portions toward the outflow end of the slider, and an enclosure step portion continuously arranged along an outflow end edge and opposite side edges of the facing surface from the trailing step portion to opposite sides of the skirt portions and outsides of the side portions and formed deeper than the skirt portions and shallower than the negative-pressure cavity.

6 Claims, 6 Drawing Sheets

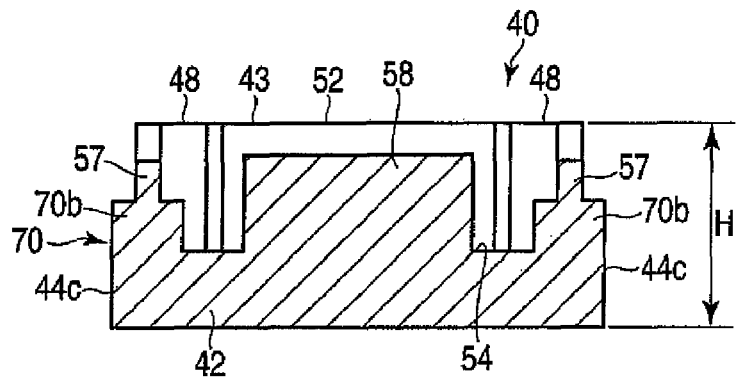
FIG. 5
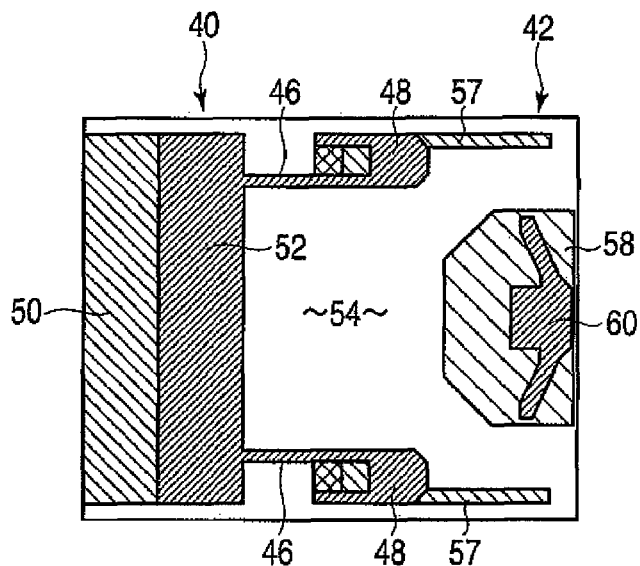
FIG. 6
| Slider | Medium Ra [nm] | Δ Atmospheric pressure [atm] | Based on comparative example/Ra = 0.1 |
|---|---|---|---|
| Comparative example | 0.1 | 0.51 | 100% |
| ↑ | 0.3 | 0.37 | 72% |
| Embodiment 1 | 0.1 | 0.29 | 58% |
FIG. 7

HEAD, HEAD SUSPENSION ASSEMBLY, AND DISK DRIVE PROVIDED WITH THE SAME

CROSS-REFERENCE TO RELATED APPLICATIONS

This application is based upon and claims the benefit of priority from Japanese Patent Application No. 2009-146796, filed Jun. 19, 2009, the entire contents of which are incorporated herein by reference.

BACKGROUND

1. Field

One embodiment of the invention relates to a head used in a disk drive such as a magnetic disk drive, a head suspension assembly provided with the head, and a disk drive provided with the head suspension assembly.

2. Description of the Related Art

A disk drive, e.g., a magnetic disk drive, comprises a magnetic disk, spindle motor, magnetic head, and carriage assembly. The magnetic disk is disposed in a base. The spindle motor supports and rotates the disk. The magnetic head writes and reads information to and from the disk. The carriage assembly supports the head for movement relative to the disk. The carriage assembly comprises a pivotably supported arm and a suspension extending from the arm. The head is supported on an extended end of the suspension. The head comprises a slider attached to the suspension and a head portion on the slider. The head portion is constructed including a reproducing head for reading and a recording head for writing.

The slider comprises a facing surface or air bearing surface (ABS) that faces a recording surface of the magnetic disk. The slider is subjected by the suspension to a predetermined head load that is directed to a magnetic recording layer of the disk. When the magnetic disk drive is powered, airflow is produced between the rotating disk and slider. Thereupon, a force (positive pressure) to fly the slider above the recording surface of the disk acts on the facing surface of the slider, based on the principle of air lubrication. By balancing this flying force and head load, the slider is flown above the recording surface of the disk with a gap therebetween. There is known a disk drive in which a negative-pressure cavity or groove producing dynamic pressure is formed near the center a facing surface of a slider, in order to prevent fluctuation of the flying height of the slider.

Specifically, this slider comprises a negative-pressure groove in a central part of an ABS, leading pad on the inflow end side of the slider, side pads extending from the leading pad toward the outflow end, and skirt portions extending from the side pads, individually, and a magnetic head is disposed on the trailing pad (e.g., Jpn. Pat. Appln. KOKAI Publication No. 2008-16068).

If the pressure within the disk drive with the magnetic head constructed in this manner is reduced by change of environment or the like, the flying height of the head may be reduced so that the head touches down or contacts a surface of a disk, in some cases. If the magnetic head contacts the disk, it vibrates and repeats touchdown and takeoff. Consequently, there is a possibility of the head being finally adhered to the disk surface.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary sectional view of the slider taken along line V-V of FIG. 4;

FIG. 6 is an exemplary plan view showing a disk drive of a magnetic head as a comparative example without an enclosure step portion;

FIG. 7 is an exemplary diagram comparatively showing adhesion atmospheric pressures (Δ atmospheric pressures) of the magnetic heads according to the first embodiment and comparative example;

DETAILED DESCRIPTION

Figure 1:
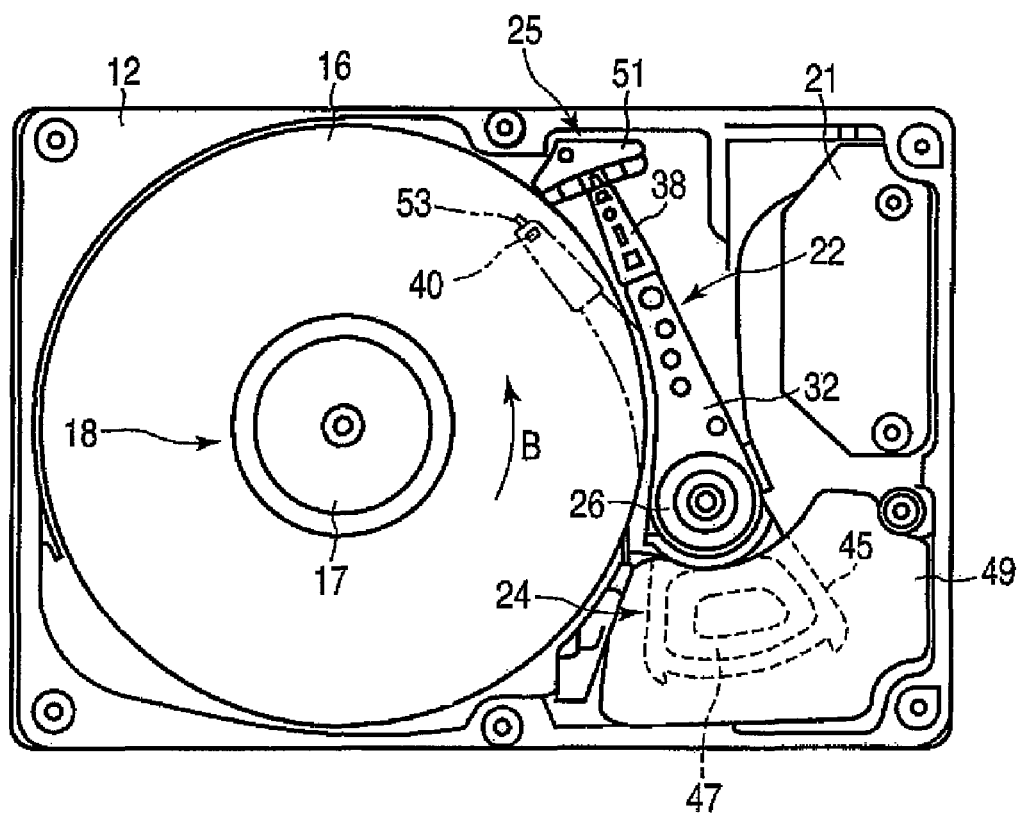
FIG. 1 is an exemplary perspective view showing an HDD according to a first embodiment of the invention.

Various embodiments according to the invention will be described hereinafter with reference to the accompanying drawings. In general, according to one embodiment of the invention, a head comprises: a slider comprising a facing surface configured to face a surface of a rotatable recording medium, and configured to fly by airflow produced between the recording medium surface and the facing surface; and a head portion on the slider and configured to perform information processing for the recording medium, the facing surface of the slider comprising a negative-pressure cavity defined by a recess in the facing surface, a leading step portion on an upstream side of the negative-pressure cavity with respect to the airflow, a pair of side portions extending in a first direction from the leading step portion toward an outflow end of the slider, a trailing step portion on an outflow side of the negative-pressure cavity with respect to the airflow, a pair of skirt portions extending in the first direction from the side portions toward the outflow end of the slider and formed deeper than the side portions, and an enclosure step portion continuously arranged along an outflow end edge and opposite side edges of the facing surface from the trailing step portion to opposite sides of the skirt portions and outsides of the side portions and formed deeper than the skirt portions and shallower than the negative-pressure cavity.

According to another aspect of the invention, a disk drive comprises: a disk recording medium; a drive section configured to support and rotate the recording medium; a head comprising a slider, which comprises a facing surface configured to face a surface of the rotatable recording medium and is configured to fly by airflow produced between the recording medium surface and the facing surface, and a head portion on the slider and configured to perform information processing for the recording medium; and a head suspension configured to support the head for movement relative to the recording medium, the facing surface of the slider comprising a negative-pressure cavity defined by a recess in the facing surface, a leading step portion on an upstream side of the negative-pressure cavity with respect to the airflow, a pair of side portions extending in a first direction from the leading step portion toward an outflow end of the slider, a trailing step portion on an outflow side of the negative-pressure cavity with respect to the airflow, a pair of skirt portions extending in the first direction from the side portions toward the outflow end of the slider and formed deeper than the side portions, and an enclosure step portion continuously arranged along an outflow end edge and opposite side edges of the facing surface from the trailing step portion to opposite sides of the skirt portions and outsides of the side portions and formed deeper than the skirt portions and shallower than the negative-pressure cavity.

A first embodiment in which a disk drive according to this invention is applied to a hard disk drive (HDD) will now be described in detail with reference to the accompanying drawings.

FIG. 1 shows the internal structure of the HDD according to the first embodiment with a top cover of its housing removed. As shown in FIG. 1, the HDD comprises the housing, which comprises a base 12 in the form of an open-topped rectangular box and a top cover (not shown). The top cover is fastened to the base by screws so as to close a top opening of the base.

The base 12 contains a magnetic disk 16 for use as a recording medium, spindle motor 18, magnetic heads 40, carriage assembly 22, and voice coil motor (VCM) 24, ramp load mechanism 25, board unit 21, etc. The spindle motor 18 serves as a drive section that supports and rotates the disk. The heads 40 write and read information to and from the disk. The carriage assembly 22 supports the heads for movement relative to the disk 16. The VCM 24 rotates and positions the carriage assembly. The ramp load mechanism 25 holds the heads in a retracted position at a distance from the disk when the heads are moved to the outermost periphery of the disk. The board unit 21 comprises a head IC and the like.

A printed circuit board (not shown) is attached to the outer surface of a bottom wall of the base 12 by screws. The circuit board controls the operations of the spindle motor 18, VCM 24, and magnetic heads 40 through the board unit 21.

The magnetic disk 16 comprises magnetic recording layers on its upper and lower surfaces, individually. The disk 16 is fitted on a hub (not shown) of the spindle motor 18 and fixed to the hub by a clamp spring 17. The disk 16 is rotated at a predetermined speed in the direction of arrow B when the spindle motor 18 is powered.

The carriage assembly 22 comprises a bearing 26, which is fixed on the bottom wall of the base 12, and arms 32 extending from the bearing. The arms 32 are spaced apart from the surfaces of the magnetic disk 16 in parallel relation and extend in the same direction from the bearing 26. The carriage assembly 22 comprises suspensions 38 each in the form of an elastically deformable elongated plate. Each suspension 38, which is formed of, for example, a leaf spring, has its proximal end fixed to the distal end of its corresponding arm 32 by spot welding or adhesive bonding and extends from the arm. Each suspension 38 may be formed integrally with its corresponding arm 32. The arms 32 and suspensions 38 constitute a head suspension, and the head suspension and magnetic heads 40 constitute a head suspension assembly.

Figure 2:
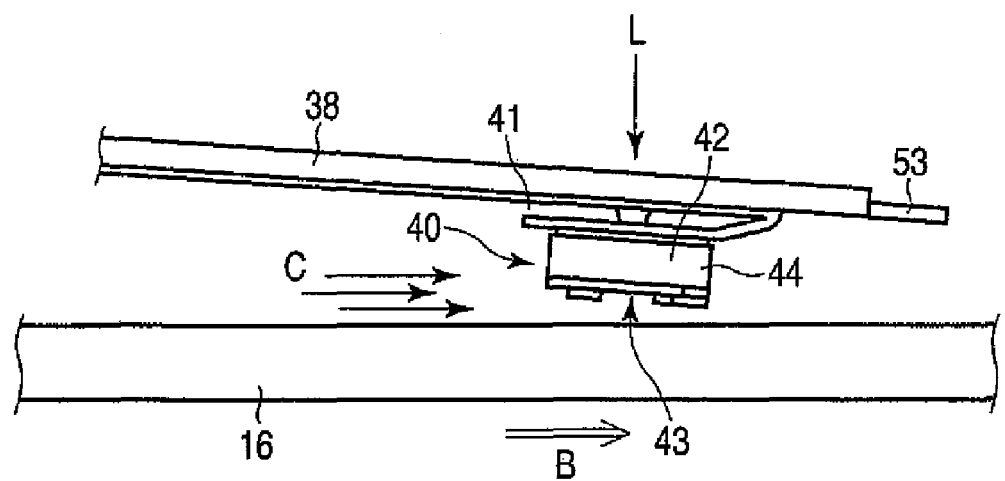
FIG. 2 is an exemplary enlarged side view showing a magnetic head portion of the HDD.

As shown in FIG. 2, each magnetic head 40 comprises a substantially cuboid slider 42 and read/write head portion 44 on the slider and is fixed to a gimbal spring 41 on the distal end portion of each suspension 38. Each head 40 is subjected by the elasticity of the suspension 38 to a head load L that is directed to a surface of the magnetic disk 16.

As shown in FIG. 1, the carriage assembly 22 comprises a support frame 45, which extends from the bearing 26 in the direction opposite from the arms 32. This support frame supports a voice coil 47 that constitutes a part of the VCM 24. The support frame 45 is made of a synthetic resin and molded integrally on the outer periphery of the voice coil 47. The voice coil 47 is located between a pair of yokes 49 fixed on the base 12. In conjunction with these yokes and a magnet (not shown) fixed to one of the yokes, the voice coil constitutes the VCM 24. If the voice coil 47 is energized, the carriage assembly 22 pivots around the bearing 26, whereupon each magnetic head 40 is moved to and positioned in a region over a desired track of the magnetic disk 16.

The ramp load mechanism 25 comprises a ramp 51, which is disposed on the bottom wall of the base 12 so as to be located outside the magnetic disk 16, and tabs 53 (FIG. 2) extending individually from the respective distal ends of the reverse conductor 38. When the carriage assembly 22 pivots to its retracted position outside the disk 16, each tab 53 engages with a ramp surface formed on the ramp 51 and is then pulled up along the slope of the ramp surface, whereupon each magnetic head 40 is unloaded.

Figure 3:
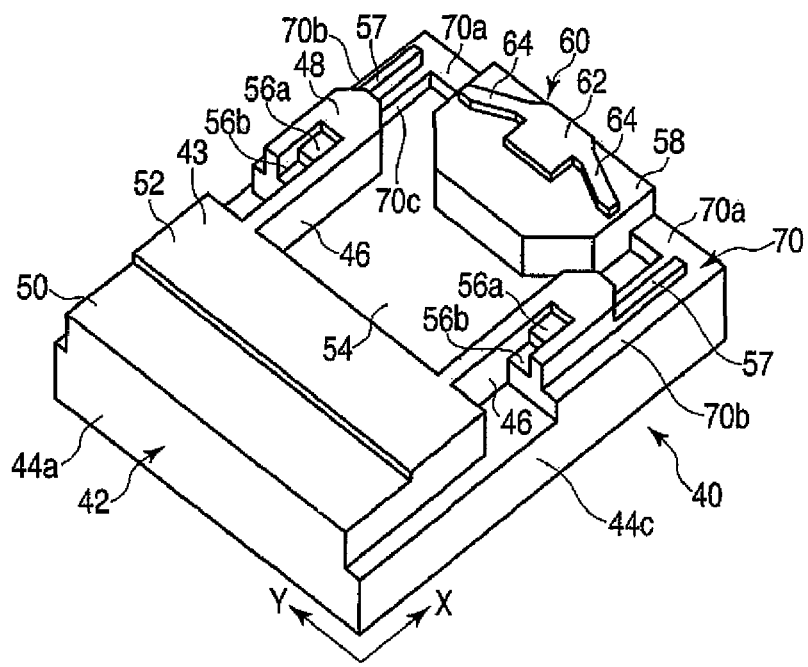
FIG. 3 is an exemplary perspective view showing the disk-facing surface side of a slider of the magnetic head.
Figure 4:
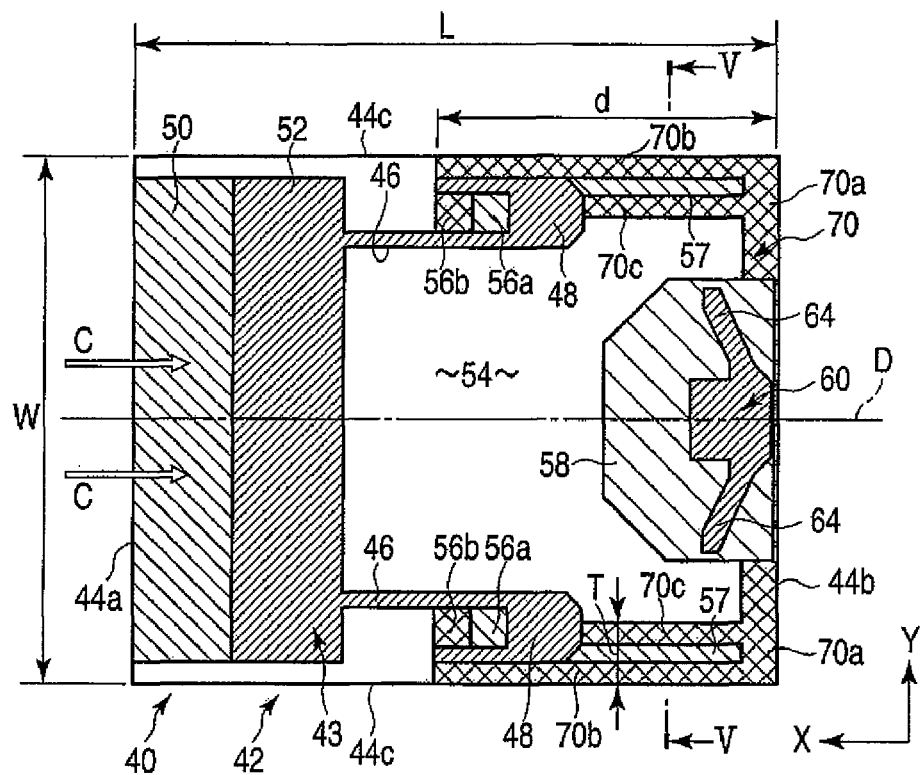
FIG. 4 is an exemplary plan view showing the disk-facing surface side of the slider.

The configuration of the magnetic head 40 will now be described in detail. FIG. 3 is an exemplary perspective view showing the slider of the head, FIG. 4 is an exemplary plan view of the slider, and FIG. 5 is an exemplary sectional view of the slider.

As shown in FIGS. 2 to 5, each magnetic head 40 comprises the substantially cuboid slider 42. The slider comprises a rectangular disk-facing surface or air bearing surface (ABS) 43, inflow end face 44a, outflow end face 44b, and a pair of side faces 44c. The disk-facing surface 43 faces the surface of the magnetic disk 16. The inflow and outflow end faces 44a and 44b individually extend at right angles to the disk-facing surface. The side faces 44c individually extend at right angles to the disk-facing surface between the end faces 44a and 44b.

The longitudinal direction of the disk-facing surface 43 is defined as a first direction X, and the transverse direction at right angles to it as a second direction Y. The slider 42 is constructed as a so-dalled femto-slider, measuring 1.25 mm or less, e.g., 0.85 mm, in length L in the first direction X and 1.0 mm or less, e.g., 0.7 mm, in width W in the second direction Y.

Each magnetic head 40 is constructed as a flying head, and the slider 42 is flown by airflow C (FIG. 2) that is produced between the disk surface and disk-facing surface 43 as the magnetic disk 16 rotates. When the HDD is powered, the disk-facing surface 43 of the slider 42 never fails to be opposed to the disk surface across a gap. The direction of airflow C is coincident with a direction of rotation B of the disk 16. The slider 42 is located relative to the surface of the disk 16 in such a manner that the first direction X of the disk-facing surface 43 is substantially coincident with the direction of airflow C.

As shown in FIGS. 3 to 5, a negative-pressure cavity or recess 54 is formed in the disk-facing surface 43, ranging from a substantially central part of the disk-facing surface to the outflow end side. The negative-pressure cavity 54 opens toward the outflow end face 44b. A thickness H of the slider 42 is set to, for example, 0.23 mm, and the depth of the cavity 54 to 800 to 1,500 nm, e.g., to 1,500 nm. The negative-pressure cavity 54 can produce a negative pressure on the central part of the disk-facing surface 43 at every feasible yaw angle for the HDD.

A substantially rectangular leading step portion 50 is formed at the inflow end portion of the disk-facing surface 43. The leading step portion 50 projects above the bottom surface of the negative-pressure cavity 54 so as to be one level (e.g., 100 nm) lower than the disk-facing surface 43 and is located on the inflow side of the cavity 54 with respect to airflow C.

The disk-facing surface 43 comprises a pair of side portions 46 that extend along its side edges and are opposed to each other with a space therebetween in the second direction Y. These side portions 46 project above the bottom surface of the negative-pressure cavity 54. The side portions 46 extend from the leading step portion 50 toward the downstream end. About one half of each side portion 46 on the outflow end side is wider (in the second direction) than the other half on the inflow end side.

The leading step portion 50 and side portions 46 are disposed symmetrically with respect to a central axis D of the slider 42 and form a substantially U-shaped structure as a whole, closed on the upstream side and opening downstream. The leading step portion 50 and side portions 46 define the negative-pressure cavity 54.

In order to maintain the pitch angle of each magnetic head 40, a leading pad 52 that supports the slider 42 by means of an air film is formed protruding from the leading step portion 50. The leading pad 52 continuously extends across the width of the leading step portion 50 in the second direction Y and is offset downstream from the inflow end face 44a of the slider 42.

A side pad 48 is formed on each side portion 46 so as to connect with the leading pad 52. The leading pad 52 and side pads 48 are substantially flat and form the disk-facing surface 43.

A first recess 56a and second recess 56b are continuously formed in each side pad 48. The first and second recesses 56a and 56b open toward the inflow end of the disk-facing surface 43 as well as toward the magnetic disk surface. Each of the recesses 56a and 56b has a rectangular shape defined by a pair of side edges extending substantially parallel to the first direction X and a bottom edge that connects respective extended ends of the side edges and extends substantially parallel to the second direction Y. The second recess 56b is one level deeper than the first recess 56a.

The disk-facing surface 43 of the slider 42 is formed with a pair of skirt portions 57, which individually extend straight in the first direction X from the side portions 46 toward the outflow end of the slider. The skirt portions 57 are formed deeper than the side portions 46 and project above the bottom surface of the negative-pressure cavity 54. When compared to the disk-facing surface 43, each skirt portion 57 is formed at a depth of 100 to 200 nm, e.g., 100 nm.

The slider 42 comprises a trailing step portion 58 formed at the outflow end portion of the disk-facing surface 43 with respect to the direction of airflow C. The trailing step portion 58 projects above the bottom surface of the negative-pressure cavity 54, and the height of its projection is equal to that of the leading step portion 50. In other words, the trailing step portion 58 is formed so that its depth below the disk-facing surface 43 is equal to that of the leading step portion 50, that is, at 50 to 250 nm, e.g., 100 nm. The trailing step portion 58 is located on the downstream side of the negative-pressure cavity 54 with respect to the direction of airflow C and substantially in the center of the disk-facing surface 43 in the second direction Y. Further, the trailing step portion 58 is slightly offset from the outflow end face 44b of the slider 42 toward the inflow end face 44a.

As shown in FIGS. 3 to 5, the trailing step portion 58 has a substantially cuboid shape of which two upstream corners are chamfered. The trailing step portion 58 has an upper surface opposed to the surface of the magnetic disk 16.

A trailing pad 60 that supports the slider 42 by means of an air film protrudes from the upper surface of the trailing step portion 58. The trailing pad 60 is formed flush with the leading pad 52 and side pads 48, and its surface constitutes the disk-facing surface 43.

The trailing pad 60 comprises a substantially rectangular base portion 62 and a pair of wing portions 64 extending in the second direction Y from the base portion to opposite sides. At the trailing step portion 58, the base portion 62 is disposed on the central axis on the outflow end side and located substantially in the center in the second direction Y. The wing portions 64 individually extend in the first direction X from the opposite ends of the base portion 62 toward the upstream end of the slider 42.

As shown in FIGS. 3 to 5, the disk-facing surface 43 of the slider 42 comprises an enclosure step portion 70 that is substantially U-shaped as a whole. The enclosure step portion 70 extends along the opposite sides of the trailing step portion 58, outside the side portions 46, and along the opposite sides of the skirt portions 57 and cover the rear end and opposite side edge portions of the disk-facing surface on the outflow end side. The enclosure step portion 70 is continuously arranged along the outflow end edge and opposite side edges of the slider 42 from the trailing step portion 58 to the opposite sides of the skirt portions 57 and the outsides of the side portions 46. The enclosure step portion 70 is formed deeper than the skirt portions 57 and shallower than the negative-pressure cavity 54 and at a depth of, for example, 230 nm.

The enclosure step portion 70 comprises two first portions 70a, two second portions 70b, and two third portions 70c. The first portions 70a extend in the second direction Y from the trailing step portion 58 to the opposite side edges of the slider 42. The second portions 70b extend in the first direction X along the side edges of the slider 42 from the first portions 70a, outside the skirt portions 57 and side portions 46, individually. The third portions 70c extend in the first direction X from the first portions 70a to the side portions 46 inside the skirt portions 57, individually. Each of the first to third portions 70a to 70c is an elongated rectangular structure of a predetermined width.

Each second portion 70b has such a length d that it extends from the first portion 70a to the inflow end of the side portion 46 corresponding thereto. Each second portion 70b is formed flush with its corresponding side faces 44c of the slider 42. A width T that combines the respective widths of each second portion 70b and its corresponding third portion 70c is adjusted so that the side edge of the third portion 70c on the side of the negative-pressure cavity 54 is located in coincidence with or outside that of the corresponding side portion 46. A corner between each pair of first and third portions 70a and 70c of the enclosure step portion 70 is substantially right-angled.

The head portion 44 of each magnetic head 40 comprises a recording element and reproducing element for recording and reproducing information on and from the magnetic disk 16. The recording and reproducing elements are embedded in a downstream end portion of the slider 42 with respect to the direction of airflow C. These elements comprise a read/write gap (not shown) formed in the trailing pad 60.

According to the HDD and head suspension assembly constructed in this manner, each magnetic head 40 is flown by airflow C produced between the disk surface and disk-facing surface 43 as the magnetic disk 16 is rotated. Thus, when the HDD is powered, the disk-facing surface 43 of the slider 42 never fails to be opposed to the disk surface across a gap. As shown in FIG. 2, the magnetic head 40 flies in such a tilted posture that the read/write gap of the head portion 44 is located closest to the disk surface.

In each magnetic head 40, the negative-pressure cavity 54 in the disk-facing surface 43 of the slider 42 can produce a negative pressure on the central part of the disk-facing surface 43 at every feasible yaw angle for the HDD. Further, the enclosure step portion 70, which encloses the outsides of the skirt portions 57 and side portions 46 and the opposite sides of the trailing step portion 58, serves to improve the vibration damping force of the slider 42 in its rolling direction. Consequently, the vibration amplitude of the magnetic head 40 can be reduced even when the head touches down or contacts the surface of the magnetic disk 16. Thus, the magnetic head can be prevented from being adhered to the disk surface.

The inventors hereof prepared the magnetic head according to the present embodiment and a magnetic head comprising a slider according to a comparative example without an enclosure step portion by which the outflow end side of the slider is enclosed, as shown in FIG. 6, and compared the adhesion properties of these magnetic heads by conducting a touchdown-takeoff test. FIG. 7 shows results of the test.

As shown in FIG. 7, the adhesion atmospheric pressure (Δ atmospheric pressure) of the magnetic head of the HDD according to Example 1 was 0.29 atm., indicating an improvement of 42% when compared to the magnetic head of the comparative example. This indicates that properties for adhesion (or takeoff performance) to the medium surface can be considerably improved by means of the magnetic head of the present embodiment even if the average roughness (Ra) of the medium surface is reduced, for example, from 0.3 nm to 0.1 nm for super-smoothness, in order to improve the recording density of the HDD.

The guaranteed atmospheric pressure for a 2.5-inch HDD required of a mobile device, such as notebook computer, is 0.7 atm. (=atmospheric pressure at 3,000-m altitude). If the Δ atmospheric pressure is 0.29 atm., therefore, the vibrating magnetic head (in a Δ atmospheric pressure state) is returned to its original flying posture when the inside of the HDD is restored to normal pressure even after a touchdown (start of contact between the head and medium) is made at 0.7 atm., for example. Thus, the adhesion atmospheric pressure of the magnetic head is essential to the maintenance of the flying stability of the head.

The following is a description of a mechanism in which the magnetic head according to the present embodiment can reduce the adhesion atmospheric pressure (Δ atmospheric pressure). The damping farce produced on the disk-facing surface should be enhanced to suppress vibration produced by the contact between the slider and magnetic disk after the touchdown of the head. In order to reduce the resonance frequencies of the suspension and disk-facing surface that form sources of vibration, therefore, a frequency response analysis is performed for comparison based on specified frequencies of 10, 30 and 50 kHz in the rolling direction, in particular.

Figure 8:
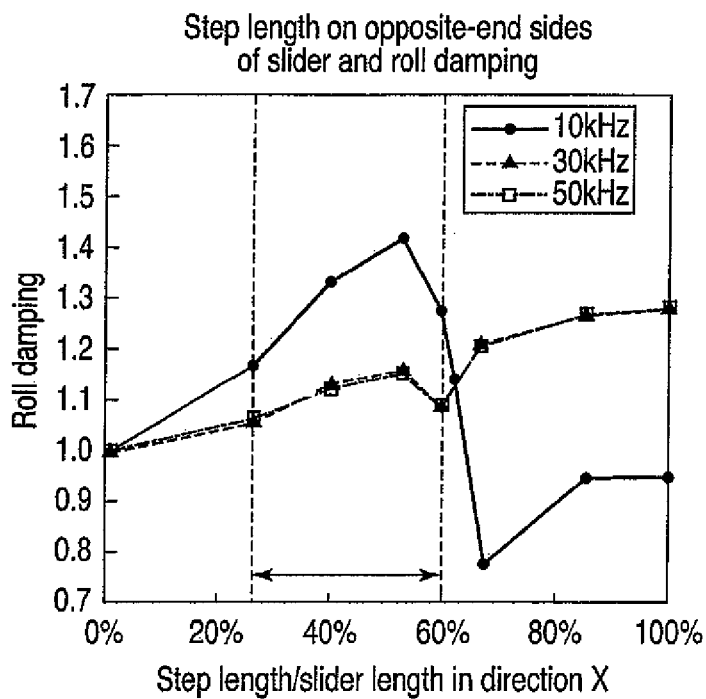
FIG. 8 is an exemplary diagram showing relationships between roll damping and the ratio between the length of the slider and that of an enclosure step portion in a first direction.

FIG. 8 shows relationships between roll damping and the ratio between the length d of each second portion 70b of the enclosure step portion 70 in the first direction X and the length L of the slider in the first direction X. As seen from FIG. 8, the roll damping can be improved at any of the three frequencies by adjusting the length d of the second portion 70b to 20 to 60% of the slider length L. Further, damping at 10 kHz is increased by as high as 40% by adjusting the length to 53% (corresponding to the present embodiment).

Figure 9:
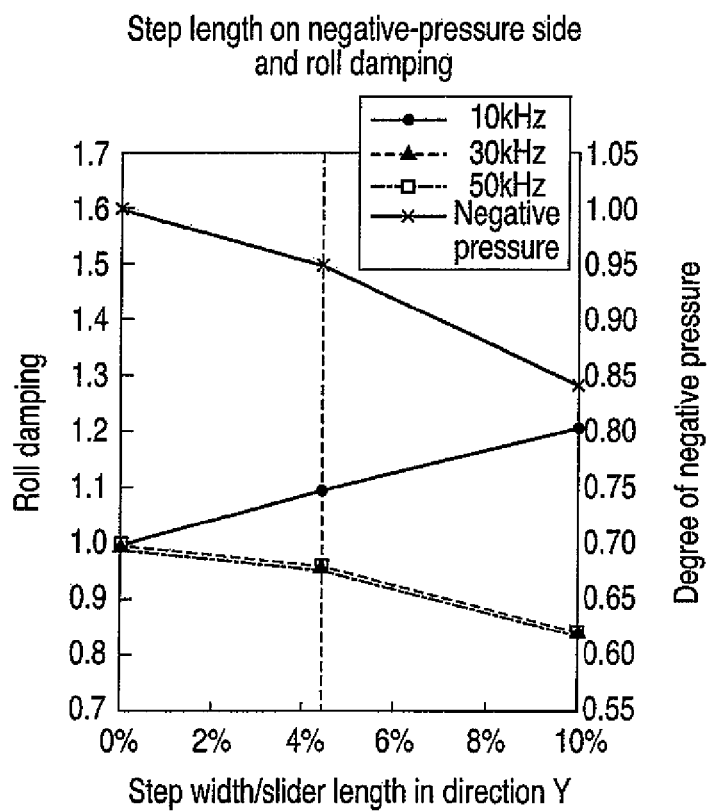
FIG. 9 is an exemplary diagram showing relationships between the roll damping, degree of negative pressure produced, and ratio between the width of the slider and that of the enclosure step portion in a second direction.

FIG. 9 shows relationships between the roll damping, degree of negative pressure produced, and ratio between the width T of the combination of the enclosure step portion 70 and second and third portions 70b and 70c and the width W of the slider in the second direction Y. As seen from FIG. 9, moderate roll damping and degree of negative pressure can be obtained at any of the three frequencies by adjusting the width T of the step portions to 4 to 5% of the slider width W.

Figure 10:
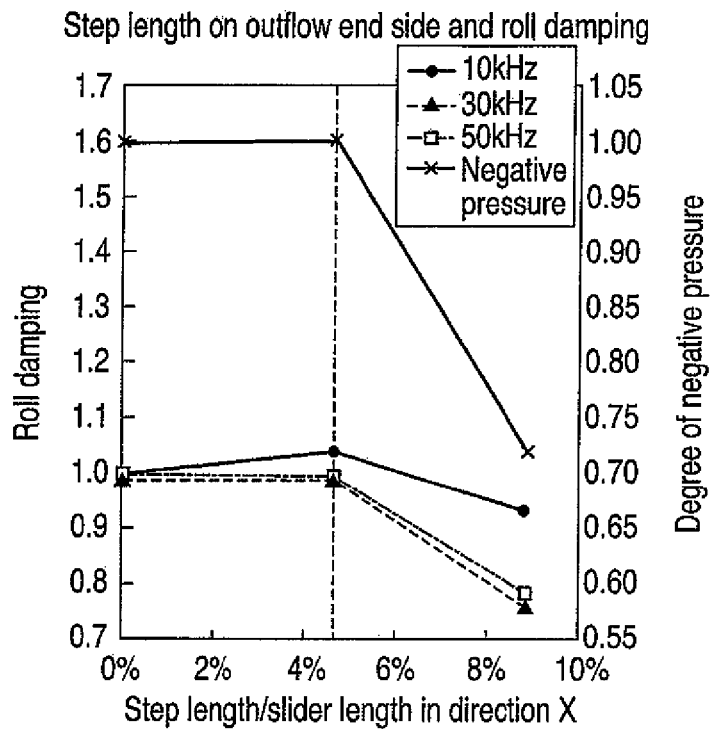
FIG. 10 is an exemplary diagram relationships between the roll damping, degree of negative pressure produced, and relative positions of respective outflow ends of the slider and enclosure step portion.

FIG. 10 shows relationships between the roll damping, degree of negative pressure produced, and ratio between the length d of the first and second portions 70a and 70b of the enclosure step portion 70 in the first direction X, that is, the position of the outflow end of the slider, and the length L of the slider in the first direction X. Now let us assume that 0% is set when the respective outflow ends of the first and second portions 70a and 70b are coincident with the outflow end edge of the slider and that the percentage increases as the outflow ends of the first and second portions are shifted toward the inflow end.

As seen from FIG. 10, the roll damping can be improved and a moderate degree of negative pressure can be obtained at any of the three frequencies by adjusting the length of the first and second portions 70a and 70b to 0 to 4.5%, that is, by making the first and second portions extend to the vicinity of the outflow end edge of the slider.

Figure 11:
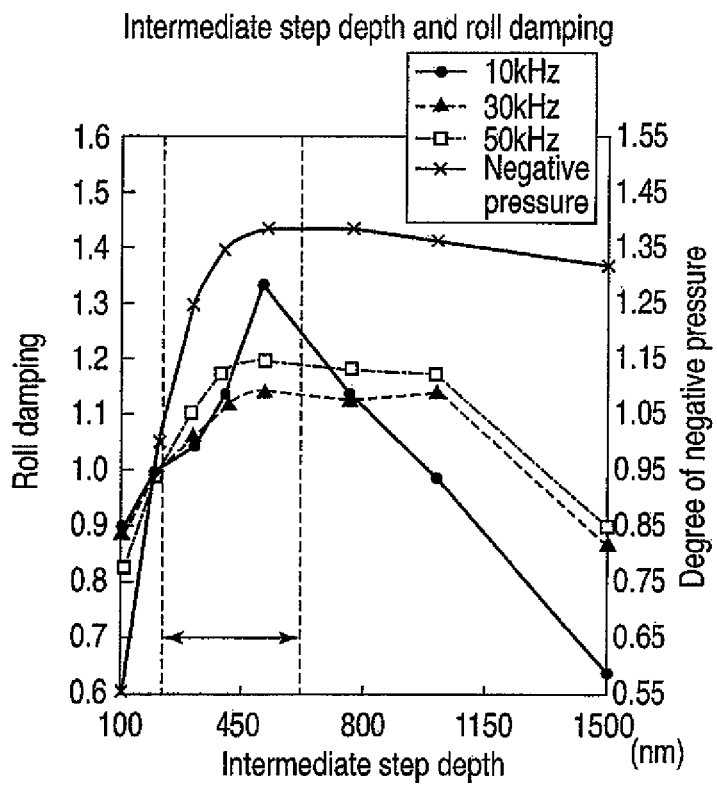
FIG. 11 is an exemplary diagram showing relationships between the roll damping; degree of negative pressure produced, and depth of the enclosure step portion.

FIG. 11 shows relationships between the roll damping, degree of negative pressure produced, and depth of the enclosure step portion 70 relative to the disk-facing surface. As seen from FIG. 11, the roll damping can be improved and a necessary degree of negative pressure can be obtained at any of the three frequencies if the depth ranges from 200 to 600 nm.

Thus, it is believed that the enclosure step portion enables a damping effect by the enclosure in the rolling direction of the slider to be combined with a damping effect by the reduction of the height-direction distance between the disk-facing surface and disk surface, so that the vibration amplitude at the time of touchdown is reduced.

The above test results indicate that an appropriate shape of the disk-facing surface of the slider is based on the following conditions. First, the length d of each of the second portions 70b on the opposite side edges of the slider should range from the outflow end of the slider to the inflow side of each side portion 46. Secondly, the position of the respective outflow ends of the second and third portions 70b and 70c should only reach an alumina part that constitutes the head portion 44. Thirdly, the width T of the second and third portions 70b and 70c should only reach the cavity-side face of each side portion 46. Fourthly, "burrs" produced on the opposite side edges during a manufacturing process for the slider can be removed by forming the enclosure step portion 70 deeper than the skirt portions and shallower than the negative-pressure cavity. Fifthly, a moderate depth of, for example, 200 to 600 nm may be used on the negative-pressure side, since too small and too large depths cause a negative-pressure loss and insufficient damping, respectively.

According to the present embodiment, as described herein, there may be provided a magnetic head with improved stability and reliability, suppressed in vibration and prevented from being adhered to a recording medium, and a head suspension assembly and a disk drive provided with the head.

Figure 12:
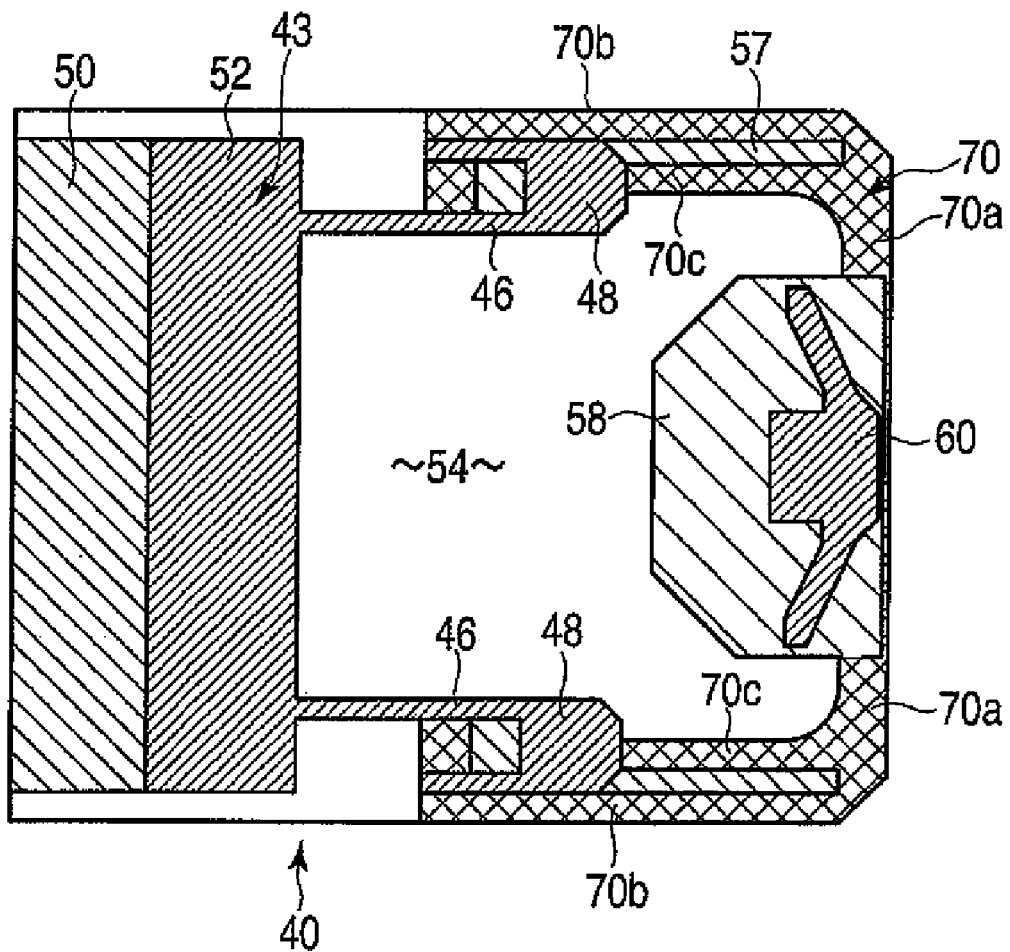
FIG. 12 is an exemplary plan view showing a magnetic head of HDD according to a second embodiment of the invention.

FIG. 12 shows a magnetic head 40 of an HDD according to a second embodiment of the invention. In an enclosure step portion 70 of a slider 42, according to the present embodiment, a corner between each pair of first and third portions 70a and 70c is circular-arc-shaped. Further, both corners of the slider 42 on the outflow end side are obliquely chamfered.

Other configurations of the magnetic head of the second embodiment are the same as those of the foregoing first embodiment. Therefore, like reference numbers refer to like parts throughout the several views of the drawing, and a detailed description of those parts is omitted. According to the second embodiment, there may also be provided a magnetic head with improved stability and reliability, suppressed in vibration and prevented from being adhered to a recording medium, and a disk drive provided with the head.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc., of the leading step portion, trailing step portion, enclosure step portion, and pads are not limited to the embodiments described herein and may be varied as required. This invention is not limited to femto-sliders and may also be applied to pico sliders, pemto sliders, or other larger sliders. The number of magnetic disks used in the disk drive may be increased without being limited to one.

What is claimed is:

1. A head comprising:
   a slider comprising a facing surface configured to face a surface of a recording medium, and configured to fly due to airflow between the recording medium surface and the facing surface; and
   a head portion on the slider and configured to read data from the recording medium or to write the data to the recording medium,
   the facing surface of the slider comprising
      a negative-pressure cavity defined by a recess in the facing surface,
      a leading step portion on an upstream side of the negative-pressure cavity with respect to the airflow,
      a pair of side portions along a first direction from the leading step portion toward an outflow end of the slider,
      a trailing step portion on an outflow side of the negative-pressure cavity with respect to the airflow,
      a pair of skirt portions along the first direction from the side portions toward the outflow end of the slider and being deeper than the side portions, and
      an enclosure step portion along an outflow end edge and side edges of the facing surface from the trailing step portion to sides of the skirt portions and outsides of the side portions and being deeper than the skirt portions and shallower than the negative-pressure cavity,
   wherein the enclosure step portion comprises first portions extending bilaterally in a second direction perpendicular to the first direction from the trailing step portion to side edges of the slider, second portions along the first direction and the side edges of the slider from the first portions, outside the skirt portions and side portions, and third portions along the first direction between the first portions and the side portions inside the skirt portions.

2. The head of claim 1, wherein the second portions extend to inflow ends of the side portions.

3. The head of claim 1, wherein a side edge of the third portion on the side of the negative-pressure cavity is located together with or outside of side edges of the side portions on the side of the negative-pressure cavity.

4. The head of claim 1, wherein a corner between each pair of first and third portions of the enclosure step portion is circular-arc-shaped.

5. A head suspension assembly in a disk drive comprising a recording medium and a driver configured to support the recording medium and to rotate the recording medium, the head suspension assembly comprising:
   a head comprising a slider, which comprises a facing surface configured to face a surface of the recording medium and is configured to fly due to airflow between the recording medium surface and the facing surface, and a head portion on the slider and configured to read data from the recording medium and to write data to the recording medium; and
   a head suspension configured to support the head for movement relative to the recording medium and to apply a head load directed to the surface of the magnetic disk to the head,
   the facing surface of the slider comprising
      a negative-pressure cavity defined by a recess in the facing surface,
      a leading step portion on an upstream side of the negative-pressure cavity with respect to the airflow,
      a pair of side portions along a first direction from the leading step portion toward an outflow end of the slider,
      a trailing step portion on an outflow side of the negative-pressure cavity with respect to the airflow,
      a pair of skirt portions along the first direction from the side portions toward the outflow end of the slider and being deeper than the side portions, and
      an enclosure step portion along an outflow end edge and side edges of the facing surface from the trailing step portion to sides of the skirt portions and outsides of the side portions and being deeper than the skirt portions and shallower than the negative-pressure cavity,
   wherein the enclosure step portion comprises first portions extending bilaterally in a second direction perpendicular to the first direction from the trailing step portion to side edges of the slider, second portions along the first direction and the side edges of the slider from the first portions, outside the skirt portions and side portions, and third portions along the first direction between the first portions and the side portions inside the skirt portions.

6. A disk drive comprising:
   a recording medium;
   a driver configured to support the recording medium and to rotate the recording medium;
   a head comprising a slider, which comprises a facing surface configured to face a surface of the recording medium and is configured to fly due to airflow between the recording medium surface and the facing surface, and a head portion on the slider and configured to read data from the recording medium and to write data to the recording medium; and
   a head suspension configured to support the head for movement relative to the recording medium,
   the facing surface of the slider comprising
      a negative-pressure cavity defined by a recess in the facing surface, a leading step portion on an upstream side of the negative-pressure cavity with respect to the airflow,
a pair of side portions along a first direction from the leading step portion toward an outflow end of the slider,
a trailing step portion on an outflow side of the negative-pressure cavity with respect to the airflow,
a pair of skirt portions along the first direction from the side portions toward the outflow end of the slider and being deeper than the side portions, and
an enclosure step portion along an outflow end edge and side edges of the facing surface from the trailing step portion to sides of the skirt portions and outsides of the side portions and being deeper than the skirt portions and shallower than the negative-pressure cavity,
wherein the enclosure step portion comprises first portions extending bilaterally in a second direction perpendicular to the first direction from the trailing step portion to side edges of the slider, second portions along the first direction and the side edges of the slider from the first portions, outside the skirt portions and side portions, and third portions along the first direction between the first portions and the side portions inside the skirt portions.

* * * * *